United States Patent [19]
Hall

[11] Patent Number: 5,975,978
[45] Date of Patent: Nov. 2, 1999

[54] PUSH-BUTTON MULTI-PITCH GRUNT DEER CALL

[76] Inventor: Stanley J. Hall, 443 Wells Rd., Doylestown, Pa. 18901

[21] Appl. No.: 09/005,116

[22] Filed: Jan. 9, 1998

[51] Int. Cl.⁶ ........................................................ A63H 5/00
[52] U.S. Cl. ............................................ 446/208; 446/209
[58] Field of Search ................................. 446/143, 207, 446/208, 209, 408; 84/330, 383 R, 102, 388, 402, 403, 408, 410

[56] References Cited

U.S. PATENT DOCUMENTS

| | | |
|---|---|---|
| 726,277 | 4/1903 | Fuller . |
| 825,610 | 7/1906 | Olt . |
| 1,484,148 | 2/1924 | Olt . |
| 2,544,370 | 3/1951 | Walther . |
| 3,020,675 | 2/1962 | Boecker . |
| 3,029,554 | 4/1962 | Mobley . |
| 3,579,903 | 5/1971 | Stewart . |
| 5,577,946 | 11/1996 | Oathout . |

OTHER PUBLICATIONS

Deer Call Advertisement, Joe Hall's Shooting Products Inc., one page.

*Primary Examiner*—Robert A. Hafer
*Assistant Examiner*—Jeffrey D. Carlson
*Attorney, Agent, or Firm*—Howson and Howson

[57] ABSTRACT

A deer grunt caller capable of producing sounds only at predetermined discrete pitches. The caller includes a reed supported in a tube through which air is blown. The air causes the reed to vibrate and the caller to emit a sound of a given pitch. A plurality of push-buttons extend radially through the sidewall of the tube and are capable of engaging the reed upon finger actuation to produce a sound at a predetermined pitch, such as that corresponding to a fawn, a doe or a buck. The use of finger actuated push buttons permits sounds of a given discrete pitch to be readily reproduced and prevents sounds at unwanted pitches from being emitted by the caller.

12 Claims, 2 Drawing Sheets

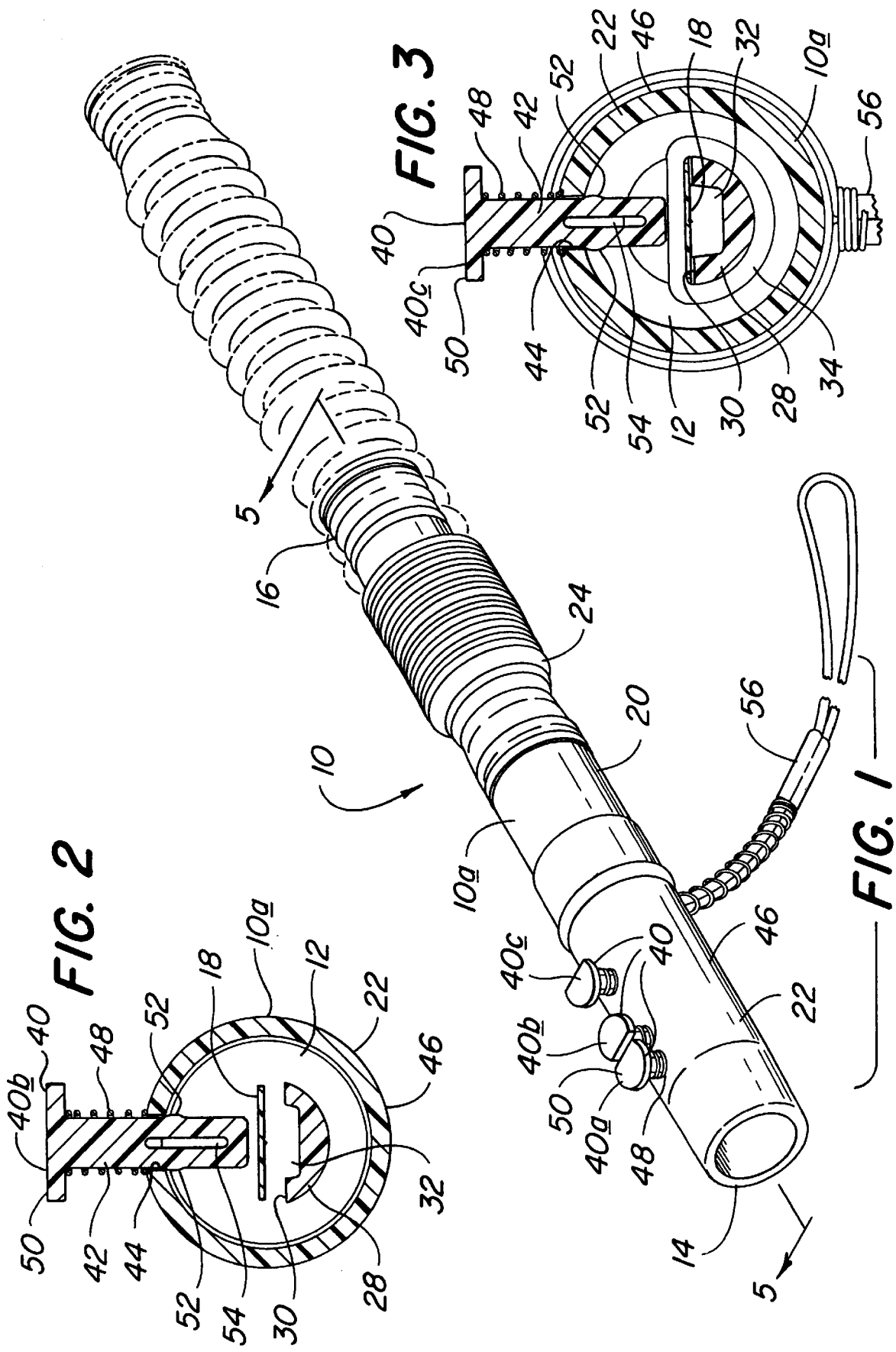

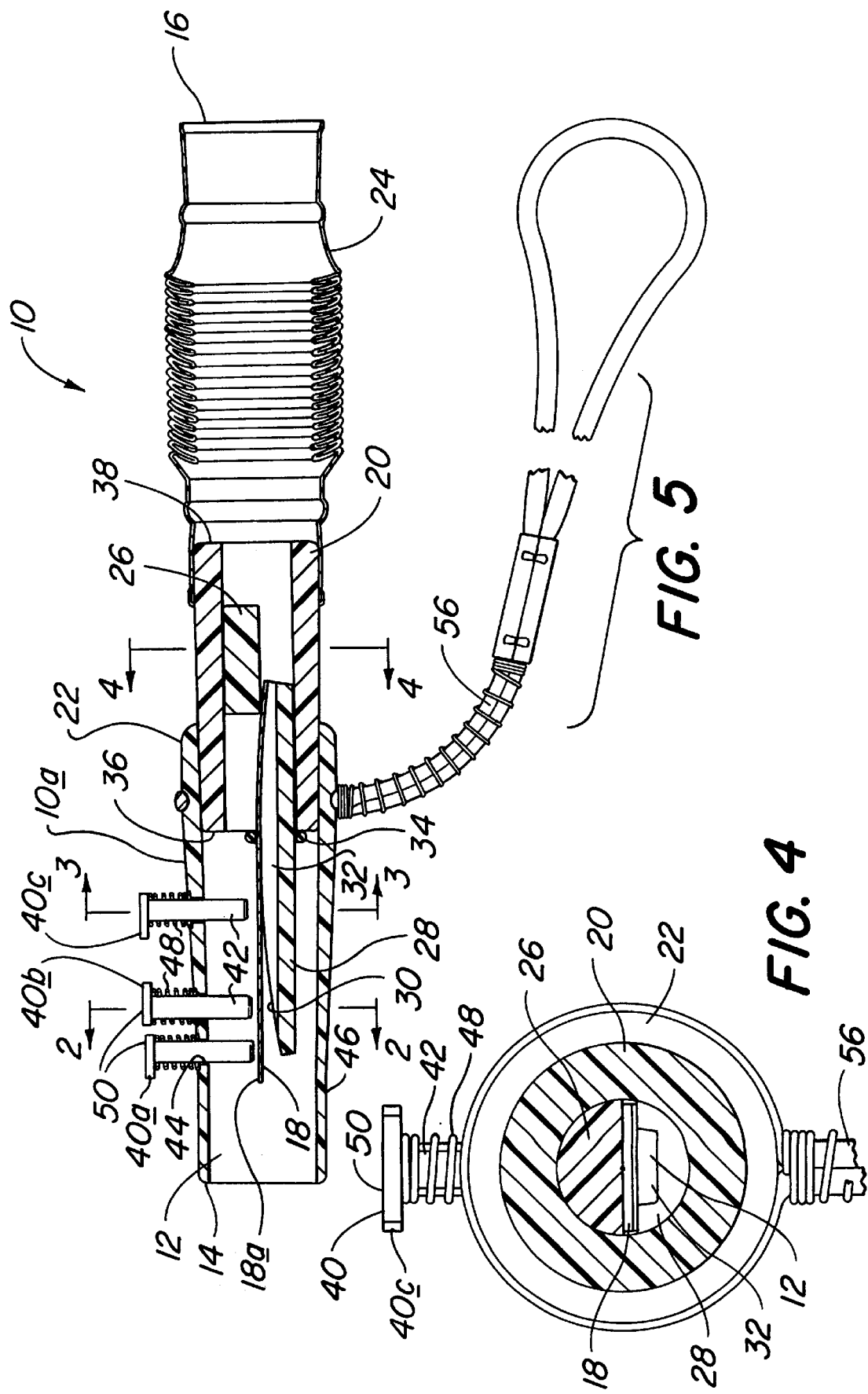

PUSH-BUTTON MULTI-PITCH GRUNT DEER CALL

FIELD OF THE INVENTION

The present invention relates to game calling devices, and more particularly, the present invention relates to an adjustable grunt that can readily and repeatedly produce sounds at a selected one of several predetermined pitches.

BACKGROUND OF THE INVENTION

Grunt calls used to simulate sounds produced by deer are known in the art. The calls generally include a reed which is supported within a call barrel and which is capable of vibrating in response to air blown into a mouthpiece of the barrel end. The vibrating reed in the call causes a sound to be emitted out of a distal end of the tube. The specific pitch of the sound is determined by the vibrational characteristic of the reed, such as the length of the vibrational portion of the reed. A hunter or wildlife enthusiast may require grunt calls which generate sounds at different pitches depending on whether the caller is intending to simulate a fawn, a doe, or a buck.

U.S. Pat. No. 5,577,946 issued to Oathout discloses a game calling device which can generate simulated deer sounds at different pitches. An open sidewall portion of the grunt tube is covered by a continuous length of elastic skin which can be manipulated anywhere along its length with finger pressure to modify the pitch of the generated sound. The Oathout patent also discloses the use of memory bands which can be positioned across the elastic skin at predetermined reference points which if manipulated corresponds to a desired sound.

U.S. Pat. No. 3,020,675 issued to Boecker discloses a goose game caller capable of generating sounds at different pitches. The goose caller includes a single radially extending plunger, or push button, which is capable of being manipulated with finger pressure to engage the reed and alter the pitch of the sound emitted by the caller.

Other wildlife game callers known in the art include U.S. Pat. Nos. 3,579,903; 726,277; 2,544,370; 1,484,148; 825,610; and 3,029,554.

Although various ones of the above-referenced game calls may be satisfactory for their intended purposes, there is a need for a single deer grunt call which is capable of selectively simulating a sound corresponding to a fawn, doe and buck. The game call should be limited to producing sounds only at several discrete predetermined pitches so that the intended sound is readily reproducible and so that sounds at unwanted pitches are prevented. The deer call should be inexpensive to manufacture and easy to use.

OBJECTS OF THE INVENTION

With the foregoing in mind, a primary object of the present invention is to provide a novel multi-pitch deer call which can repeatedly produce sounds only at several discrete pitches which correspond to the pitches of fawn, doe and buck sounds.

Another object of the present invention is to provide a deer grunt call which is inexpensive to manufacture and easy to use.

SUMMARY OF THE INVENTION

More specifically, the present invention provides an adjustable multi-pitch grunt deer caller comprising a tube which has a proximal mouthpiece end into which air is blown and a distal sound emitting end where the blown air exits the tube. A reed having a predetermined vibrational characteristic is supported within the call such that at least a portion of the reed can be caused to vibrate and generate sound in response to the blown air. At least two separate finger actuated push buttons extend radially into the tube at axially spaced-apart locations. Each push button is capable of engaging the reed at a discrete predetermined location such that, when a selected one of the push buttons is depressed, the vibrational characteristic of the reed is altered. Thus, the deer call is capable of readily and repeatedly producing sounds at different predetermined pitches by pressing one of the push buttons while air is blown into the proximal mouthpiece end of the call.

BRIEF DESCRIPTION OF THE DRAWINGS

The foregoing and other objects, features and advantages of the present invention should become apparent from the following description when taken in conjunction with the accompanying drawings, in which:

FIG. 1 is a perspective view of a deer call embodying the present invention;

FIG. 2 is a cross-sectional view of the deer call taken along line 2—2 of FIG. 5;

FIG. 3 is a cross-sectional view of the deer call taken along line 3—3 of FIG. 5;

FIG. 4 is a cross-sectional view of the deer call taken along line 4—4 of FIG. 5; and FIG. 5 is a cross-sectional view of the deer call taken along line 5—5 of FIG. 1.

DETAILED DESCRIPTION OF THE PREFERRED EMBODIMENT

As illustrated in FIG. 1, the present invention is a grunt tube deer call 10 for emitting simulated deer sounds. Similar to known grunt tubes, the deer call 10 has a tube-shaped body 10a providing an air passageway 12 from a proximal mouthpiece end 14 to a distal sound emitting end 16. A thin, flat, elongate reed 18 extends axially in the air passageway 12 such that it vibrates creating sounds when air is blown into the mouthpiece end 14 and passes out of sound emitting end 16. The reed 18 has a specific vibrational characteristic such that it generates a sound of a pre-determined pitch when vibrated in the deer call 10.

As best illustrated in FIG. 5, the deer call 10 is preferably of three-piece construction. Centrally of the body 10a is a tubular reed mounting portion 20 having a wedge 26 which restricts the passage of air and a reed support plate 28 which extends beneath the entire length of the reed 18. The reed 18 and support plate 28 are held in place within the reed mounting portion 20 by frictional engagement with the wedge 26. The support plate 28 has a sloping support surface 30 confronting the reed 18 and a lengthwise extending groove 32 which is directly beneath the reed 18 and which provides the only passageway for air through portion 20. An O-ring 34 is utilized to retain the reed 18 snug to the support plate 26 adjacent the front end 36 of portion 20. Thus, the reed 18 is firmly held in place within the deer call 10 by the middle portion 20 and projects out of the front end 36 of the middle portion 20.

The front end 36 of the middle portion 20 is telescopically received by, and frictionally secured to, a tubular mouthpiece portion 22 within which the reed is permitted to vibrate. The opposite end 38 of the middle portion 20 is telescopically received by, and frictionally secured to, an extendable tubular sound projecting portion 24. Portion 24 is illustrated in FIG. 1 with solid lines in a collapsed position and with phantom lines in a fully extended position. The function of the extendable portion 24 will be discussed later.

One of the novel aspects of the deer call 10 is that it can produce sounds at several different discrete pitches. The pitch of the sound that a deer makes depends on whether the deer is a fawn, a doe or a buck. For instance, the pitch of the buck's sound is deeper than the pitch of a doe's sound, and the pitch of a doe's sound is deeper than the pitch of a fawn's sound. Therefore, the call 10 includes a plurality of finger actuated push buttons, or plungers, 40 which are capable of altering the pitch of the sound generated by the deer call 10.

As best illustrated in FIG. 5, each push button 40 has a shaft 42 which extends through an aperture 44 in the sidewall 46 of the tubular mouthpiece portion 22 of the deer call 10. Each push button 40 utilizes a resilient biasing means, such as a spring, 48 for normally biasing the shaft 42 a spaced distance from the reed 18. As illustrated in FIG. 2, each spring 48 is captured between a finger confronting pad surface 50 of the push button 40 and the sidewall 46 of the mouthpiece portion 22, and each push button 40 is captured to the mouthpiece portion 22 by a pair of locking beads 52 engaging the inside of the sidewall 46. Each push button shaft 42 is provided with a central slot 54 which deflects inwardly and initially permits the locking beads 52 to be pressed through the aperture 44 during assembly.

Each push button 40 is capable of altering the effective vibrational length of the reed 18 which, in turn, alters the pitch of the sound created. To this end, when one of the push buttons 40 is pressed, or finger actuated, the shaft 42 of the push button 40 is urged radially into the deer call 10 into engagement with the reed 18 and firmly pins the reed 18 to the sloping support surface 30 of the reed support plate 28. Thus, only the front facing edge 18a of the reed 18 is capable of vibrating in response to passing air, thereby altering the pitch of the sound.

In the preferred embodiment, the deer call 10 has three push buttons, 40a, 40b and 40c, located at discrete, longitudinally spaced-apart positions on the deer call body 10a. Push button 40a is located nearest to the mouthpiece end 14 in a pre-determined position to produce a sound having a pitch simulating a fawn; push button 40c is located farthest from the mouthpiece end 14 in a pre-determined position to produce a sound having a pitch simulating a buck; and push button 40b is located between push buttons 40a and 40c in a pre-determined position to produce a sound having a pitch simulating a doe. As illustrated, push button 40b is located closer to push button 40a than to push button 40c. In addition, in order that push buttons 40a and 40b can be located closely together and to prevent unwanted activation, the finger confronting pad surfaces 50 of all the push buttons are semicircular. For instance, as best illustrated in FIG. 5, the semicircular surfaces 50 of push buttons 40a and 40b permit spacing therebetween and allow one of the buttons to be depressed without the other of the buttons being depressed.

Additional refinements of the tonal qualities of the deer call 10 is permitted. For instance, the extendable sound projecting portion 24 can be compressed, fully extended, or partially extended. See FIG. 1. In addition, the O-ring 34 can be repositioned relative to the front 36 of the middle portion 20 and the type, size, and material of the reed 18 can be selected to further refine the sounds produced by the deer call 10. The tubular portions of the deer call are preferably manufactured of plastic; however, a different material could be utilized which will also have an effect on tonal output.

A carrying strap 56 is provided on the deer call 10. As illustrated in FIG. 5, the carrying strap 56 connects to the mouthpiece portion 22 of the call 10.

In view of the foregoing, it should be readily apparent that the present invention provides an adjustable multi-pitch deer caller which provides discrete reproduction of sounds of a limited number of pre-determined pitches. The deer call is easy to use and, since only discrete pitches are permitted by a number of push buttons, sounds produced at unwanted pitches are prevented from being emitted. Further refinement of the tonal qualities of the deer caller is provided, for instance, by the extendable sound projection portion.

While a preferred deer call has been described in detail, various modifications, alterations, and changes may be made without departing from the spirit and scope of the present invention as defined in the appended claims.

I claim:

1. An adjustable multi-pitch grunt deer caller, comprising:
   a tube having a proximal mouthpiece end into which air is blown and a distal sound emitting end where the blown air exits said tube;
   a reed having a predetermined vibrational characteristic and supported within said tube such that at least a portion of said reed is caused to vibrate and generate sound in response to said blown air; and
   at least two separate finger actuated push buttons extending radially into said tube at axially spaced-apart locations for engaging said reed at discrete predetermined locations such that when a selected one of said push buttons is depressed said vibrational characteristic of said reed is altered;
   each of said push buttons having a shaft with at least one peripherally extending locking bead for retaining said push buttons to said tube, and each shaft having a hollow central slot adjacent said locking bead to permit initial insertion of said shaft into said tube during assembly;
   whereby readily reproducible sounds at different predetermined pitches are generated by pressing a different one of said push buttons while air is blown into said proximal mouthpiece end of said tube.

2. The adjustable multi-pitch grunt deer caller according to claim 1, wherein each of said push buttons have a semicircular finger confronting pad surface.

3. The adjustable multi-pitch grunt deer caller according to claim 1, wherein each of said push buttons has a biasing means for resiliently biasing said push button out of engagement with said reed when said push button is un-actuated.

4. The adjustable multi-pitch grunt deer caller according to claim 3, wherein each of said biasing means is a spring.

5. The adjustable multi-pitch grunt deer caller according to claim 1, wherein said reed is flat and elongate, and wherein said push buttons are moveable in a transverse direction relative to said reed.

6. The adjustable multi-pitch grunt caller according to claim 5, wherein said reed is supported above a tapered reed supporting surface so that when one of said push buttons is depressed, said depressed push button pins said reed to said tapered reed supporting surface at said discrete predetermined location to alter said vibrational characteristic of said reed.

7. An adjustable multi-pitch grunt deer caller, comprising:
   a body having a tubular sidewall, a proximal mouthpiece end into which air is blown, and a distal sound emitting end where the blown air exits said body;

a thin, elongate reed having a predetermined vibrational characteristic and supported within said body such that at least a portion of said reed is caused to vibrate and generate sound in response to said blown air; and three separate, spaced-apart finger-actuated push buttons each having a finger pad located exteriorly of said body and a shaft extending radially through said sidewall and into said body at a location adjacent said reed;

each of said shafts having at least one peripherally extending locking bead for capturing a portion of said shaft inside said tubular sidewall of said body and a central slot adjacent said locking bead to permit deflection of said shaft to permit initial insertion of said shaft into said body during assembly;

each push button, when actuated, being capable of engaging said reed at a discrete predetermined location to alter said vibrational characteristic of said reed, a first one of said push buttons being located closest to said proximal mouthpiece end, a second one of said push buttons being located closer to said proximal mouthpiece end than a third one of said push buttons, and said second one being located closer to said first one than said third one of said push buttons;

whereby readily reproducible sounds at different predetermined pitches are generated by pressing a different one of said push buttons while air is blown into said proximal mouthpiece end of said tube.

8. The adjustable multi-pitch grunt deer caller according to claim 7, wherein each of said finger pads is semicircular in shape so that a pair of adjacent push buttons are capable of being located closely together.

9. The adjustable multi-pitch grunt deer caller according to claim 8, wherein each of said push buttons has a spring captured between said finger pad and said tubular sidewall of said body for resiliently biasing said push button out of engagement with said reed when said push button is un-actuated.

10. The adjustable multi-pitch grunt deer caller according to claim 9, wherein said body is formed by a mouthpiece portion, a reed mounting portion and a extendable sound projecting portion, and wherein said push buttons are located on said mouthpiece portion.

11. An adjustable multi-pitch grunt deer caller, comprising:

a body having a tubular sidewall, a proximal mouthpiece end into which air is blown, and a distal sound emitting end where the blown air exits said body;

a thin, elongate reed having a predetermined vibrational characteristic and supported within said body such that at least a portion of said reed is caused to vibrate and generate sound in response to said blown air; and a plurality of spaced-apart, finger-actuated push buttons each having a finger pad located exteriorly of said body and a shaft extending radially through said sidewall and into said body at a location adjacent said reed, each push button, when actuated, being capable of engaging said reed at a discrete predetermined location to alter said vibrational characteristic of said reed, and each of said finger pads being semicircular in shape so that a pair of adjacent push buttons are capable of being located closely together;

each of said shafts having at least one peripherally extending locking bead for capturing a portion of said shaft inside said tubular sidewall of said body and a central slot adjacent said locking bead to permit deflection of said shaft to permit initial insertion of said shaft into said body during assembly.

12. The adjustable multi-pitch grunt deer caller according to claim 11, wherein said body is formed by a mouthpiece portion, a reed mounting portion and a extendable sound projecting portion, and wherein said push buttons are located on said mouthpiece portion.

* * * * *